United States Patent [19]

Yun

[11] Patent Number: 5,436,771
[45] Date of Patent: Jul. 25, 1995

[54] APPARATUS FOR CORRECTING A PICK-UP SIGNAL OF A DIGITAL MAGNETIC RECORDING AND REPRODUCING APPARATUS

[75] Inventor: Jong-kyung Yun, Suwon, Rep. of Korea

[73] Assignee: Samsung Electronics Co., Ltd., Kyungki, Rep. of Korea

[21] Appl. No.: 972,810

[22] Filed: Nov. 6, 1992

[30] Foreign Application Priority Data

Nov. 12, 1991 [KR] Rep. of Korea .................... 91-20051
Nov. 12, 1991 [KR] Rep. of Korea .................... 91-20053

[51] Int. Cl.$^6$ .......................... G11B 5/035; G11B 5/09
[52] U.S. Cl. ......................................... 360/65; 360/46
[58] Field of Search ................... 360/46, 45, 65, 66, 360/67, 68, 63, 54

[56] References Cited

U.S. PATENT DOCUMENTS

| | | | |
|---|---|---|---|
| 4,774,601 | 9/1988 | Ouchi et al. | 360/46 |
| 4,809,090 | 2/1989 | Suzuki | 360/66 X |
| 5,050,002 | 9/1991 | Suzuki et al. | 360/46 |
| 5,134,528 | 7/1992 | Sato | 360/67 X |

Primary Examiner—Donald Hajec
Assistant Examiner—Le Thien Minh
Attorney, Agent, or Firm—Sughrue, Mion, Zinn, Macpeak & Seas

[57] ABSTRACT

A playback equalizing circuit of a digital magnetic recording and reproducing apparatus including a signal processing unit for equalizing, delaying and waveform-shaping a signal picked-up from a magnetic tape via a playback head, a signal outputting unit for comparing a signal processed in the signal processing unit and a predetermined reference signal and outputting the comparison, and a reference signal controlling unit for responding to the level of the picked-up signal and controlling the reference signal in a variable-speed playback mode. The circuit responds to the level variation of a playback signal and controls a reference voltage to improve playback characteristics during such variable-speed reproducing as a high-speed search. In another embodiment, the playback equalizing circuit includes an envelope detecting circuit for detecting the envelope level of a picked-up signal, and an AGC unit for controlling the gain of the envelope level detected from the envelope detecting circuit.

6 Claims, 6 Drawing Sheets

FIG. 3 (PRIOR ART)
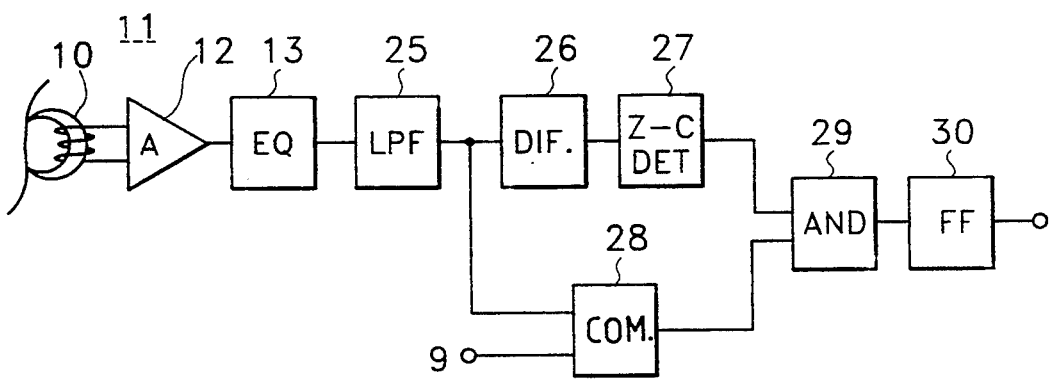
FIG. 4A (PRIOR ART)
FIG. 4B (PRIOR ART)
FIG. 4C (PRIOR ART)
FIG. 4D (PRIOR ART)
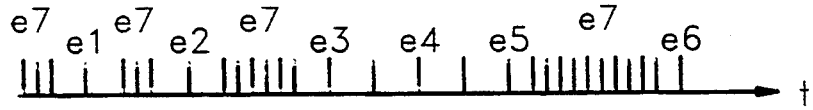
FIG. 4E (PRIOR ART)
FIG. 4F (PRIOR ART)
FIG. 4G (PRIOR ART)
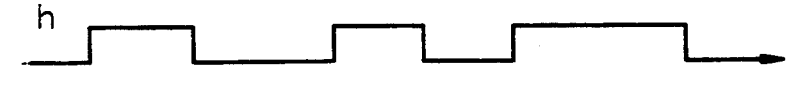
FIG. 4H (PRIOR ART)

APPARATUS FOR CORRECTING A PICK-UP SIGNAL OF A DIGITAL MAGNETIC RECORDING AND REPRODUCING APPARATUS

BACKGROUND OF THE INVENTION

The present invention relates to a digital magnetic recording and reproducing apparatus, and more particularly to a playback equalizing circuit for improving the quality of a playback signal during reproducing at a variable speed such as a high-speed search in a video cassette recorder, and stably performing playback equalization.

A digital video cassette recorder (hereinafter referred to as a VCR) is an apparatus for converting an analog image signal into a digital image signal, recording the digital signal onto a magnetic tape, and then reproducing the image. The digital data is recorded onto a magnetic tape in the direction of magnetization corresponding to the recording current whose polarity is reversed at the rising and falling edges of a pulse signal. During reproducing, the change of the reproducing current corresponding to the direction of magnetization is detected, and the pulse signal is restored. Also during reproducing, the signal picked up through a playback head is amplified, and then is equalized to be high-frequency-compensated. Then, the original signal and the delayed signal are matched to each other, and its waveform is shaped to be compared with a constant reference voltage, so that the pulse signal is reproduced. A conventional method for reproducing a pulse signal is explained in detail with reference to FIG. 1.

A conventional playback equalizing circuit illustrated in FIG. 1 includes a playback head 11 for converting information recorded on a magnetic tape 10 into an electrical signal, an amplifier 12 for amplifying the signal picked up from the playback head, an equalizer 13 for reinforcing the high-frequency component of the playback signal, a delay line 14 for delaying a signal having a reinforced high-frequency component for a predetermined time, an adder 15 for summing the undelayed signal having a reinforced high-frequency component and the signal delayed for a predetermined time, first and second comparators 16 and 18 for respectively comparing first and second reference voltages with the output of the adder, first and second reference voltage generators 17 and 19 for generating the first and second reference voltages, and an OR gate 20 for the logical operation of the outputs from the comparators.

The operation of the playback equalizing circuit constructed as above will be explained in reference to the waveforms of FIG. 2.

FIG. 2A shows the original signal recorded on a magnetic tape. When the digital data recorded on magnetic tape 10 is picked up through playback head 11, the output waveform can be represented as shown in FIG. 2B. The high-frequency component of the output waveform is compensated via equalizer 13, and the waveform then appears as shown with solid lines in FIG. 2C. (Here, a low-pass filter can be installed in order to remove a low-frequency component among the signals output by equalizer 13.) The frequency-compensated signal (represented as solid lines) is delayed through a delay line 14, to become the waveform represented by dotted lines (FIG. 2C). The solid-line waveform output from equalizer 13 and the dotted-line waveform output from delay line 14 are summed in adder 15, thereby eliminating the out-of-phase portions. The result is output as shown in FIG. 2D. The waveform of FIG. 2D is simultaneously supplied to the non-inverting input terminal of a first comparator 16, to be compared with a first reference voltage of a first reference voltage generator 17 which is supplied to the inverting input terminal, and the inverting input of a second comparator 18, to be compared with a second reference voltage of a second reference voltage generator 19. The output waveform of first comparator 16 is represented in FIG. 2E, and FIG. 2F is that of second comparator 18. The OR gate 20 OR-operates the output waveforms of the first and second comparators as shown in FIGS. 2E and 2F, to output a waveform as shown in FIG. 2G.

Also, a differential method illustrated in FIG. 3 is used as another method for extracting such a digital signal, which differentiates the signal reproduced from a head, distinguishes the rising or falling edges of the digital signal by detecting the zero-crossing points of the differentiated signal, and restores the waveform of the digital signal. An apparatus using the differential method includes a differentiator 26 for differentiating the output signal of equalizer 13 without using the delay line 14 of FIG. 1, a zero-crossing detector 27 for detecting the zero-crossing points of the differentiated signal, a voltage comparator 28 for outputting a peak value according to the value resulted by comparing the reference voltage and the output signal of equalizer 13, an AND operator 29 for AND-operating the output signal of voltage comparator 28, and the output signal of zero-crossing detector 27, and a flip-flop 30 for reproducing the original digital signal by means of the output of AND operator 29, thereby reproducing a signal.

The operation of the playback equalizing circuit according to such a conventional differentiating method will be explained in reference to the waveforms of FIG. 4.

FIG. 4A shows the waveform of a recorded digital signal, and FIG. 4B shows the pick-up signal output from a playback head, FIG. 4C shows the signal after its high-frequency component is reinforced by the equalizer 13, and FIG. 4D shows the differentiated signal shown in FIG. 4C. FIG. 4E shows a zero-crossing pulse signal which represents the extracted zero-crossing points of the differentiated signal, which includes pulses e1 through e6 generated at a point where the recorded digital signal corresponds to rising or falling edges, and pulse e7 generated by a similar zero-crossing according to a noise component. FIG. 4F shows a gate signal generated by voltage comparator 28 which compares the output of low-pass filter 25 with the voltage supplied to the reference voltage terminal, and which outputs a peak value. FIG. 4G shows a zero-crossing pulse signal resulting from the AND operation (performed by AND operator 29) of the zero-crossing pulse signal and the gate signal, wherein pulse e7 is removed. This signal drives a flip-flop 30 to obtain a restored digital signal as shown in FIG. 4H.

Such an apparatus for reproducing a signal experiences no problems while reproducing an ordinary signal, but does when reproducing at a variable speed, that is, when a special function is required. Such a problem will be described with reference to FIGS. 5A and 5B.

FIG. 5A is a diagram showing the trace of review or cue operation of a playback head scanning a tape, and FIG. 5B shows envelope waveforms of the picked-up signal of FIG. 5A. As shown in FIG. 5B, the picked-up signal during special reproducing exhibits a remarkable reduction in the amplitude of the front and rear parts of its scanning period as compared with the central portion thereof. Such phenomena is generated because the head traverses and scans the track where signals on a tape are recorded, and is unavoidable in a rotary-magnetic-head-drum-type recording and reproducing apparatus. When such a signal is input to a reproducing apparatus such as those illustrated in FIG. 1 or 3, the amplitude of a high frequency component thereof is unstable, so that the signal is much weaker than the reference voltage. Therefore, the signal is difficult to reproduce, and sometimes cannot be reproduced at all. Accordingly, in the case of a special reproducing, in order to reproduce the recorded signal, it is necessary to lengthen a valid term of a picked-up signal to reproduce the amplitude of the front and rear parts of the picked-up signal which is equal to that of its central part.

Also, since in such a playback equalizing circuit, during reproducing at a variable speed, a playback head traverses and scans a plurality of tracks on a magnetic tape, and the level of a reproduced high-frequency signal becomes unstable, it is difficult to reproduce a signal accurately when compared by means of a constant reference voltage, and thereby renders reproduction impossible. Accordingly, during reproducing at a variable speed, it is necessary to respond to a reproduced signal, control the reference voltage level, and stabilize the playback characteristics.

SUMMARY OF THE INVENTION

The object of the present invention is to provide an apparatus for improving the quality of a reproduced signal during a special playback such as a high-speed search, in order to solve the problem of the prior art.

Another object of the present invention is to provide an apparatus for lengthening the valid term of a picked-up signal of a digital magnetic recording and reproducing apparatus.

Another object of the present invention is to provide an apparatus capable of stabilizing the playback characteristics by responding to the reproduced signal of a digital magnetic recording and reproducing apparatus during reproducing at a variable speed, and controlling the reference voltage level.

That is, the present invention stably reproduces a signal by controlling the reference voltage level and the envelope level in order to stabilize the playback characteristics.

In order to stabilize a playback signal by controlling a reference voltage level, there is provided a playback equalizing circuit in a digital magnetic recording and reproducing apparatus, the circuit comprising:

a signal processing unit for equalizing, delaying and waveform-shaping a signal picked up from a magnetic tape via a playback head;

a signal outputting unit for comparing a signal processed in the signal processing unit and a predetermined reference signal and outputting the comparison; and a reference signal controlling unit for responding to the level of the picked up signal and controlling the reference signal in a variable-speed playback mode.

The reference signal controlling unit comprises:

input means for inputting the picked-up signal in the variable-speed playback mode;

envelope detecting means for detecting an envelope of a signal input via the input means;

delaying means for matching the output of the detecting means to the output of the signal processing unit; and outputting means for supplying the output of the delaying means to the reference voltage supplying unit of the signal outputting unit.

In order to reproduce a signal by stabilizing an envelope level, according to the present invention, there is provided a digital magnetic recording/reproducing apparatus including a pick up means for converting digital information recorded onto a magnetic recording medium into a electrical signal, converting means for converting the level of a signal picked up in the pickup means, and data restoring means for reproducing the original information from the level-converted signal, the circuit comprising:

envelop detecting means for detecting the RF envelope level of the picked-up signal; and automatic gain control means for controlling the gain of the envelope level of the signal picked up by the envelope level detected from the envelope level detecting means.

BRIEF DESCRIPTION OF THE DRAWINGS

Further features and advantages will become more apparent from the following and more particular description of the preferred embodiments of the invention as illustrated in the accompanying drawings in which the same reference characters and numerals generally refer to like parts throughout the views, and in which:

FIG. 3 is a block diagram showing a conventional playback equalizing circuit of digital magnetic recording and reproducing apparatus using a differential method;

FIGS. 4A to 4H show the output waveforms of the respective elements of FIG. 3;

DETAILED DESCRIPTION OF THE PREFERRED EMBODIMENTS

Figure 1:
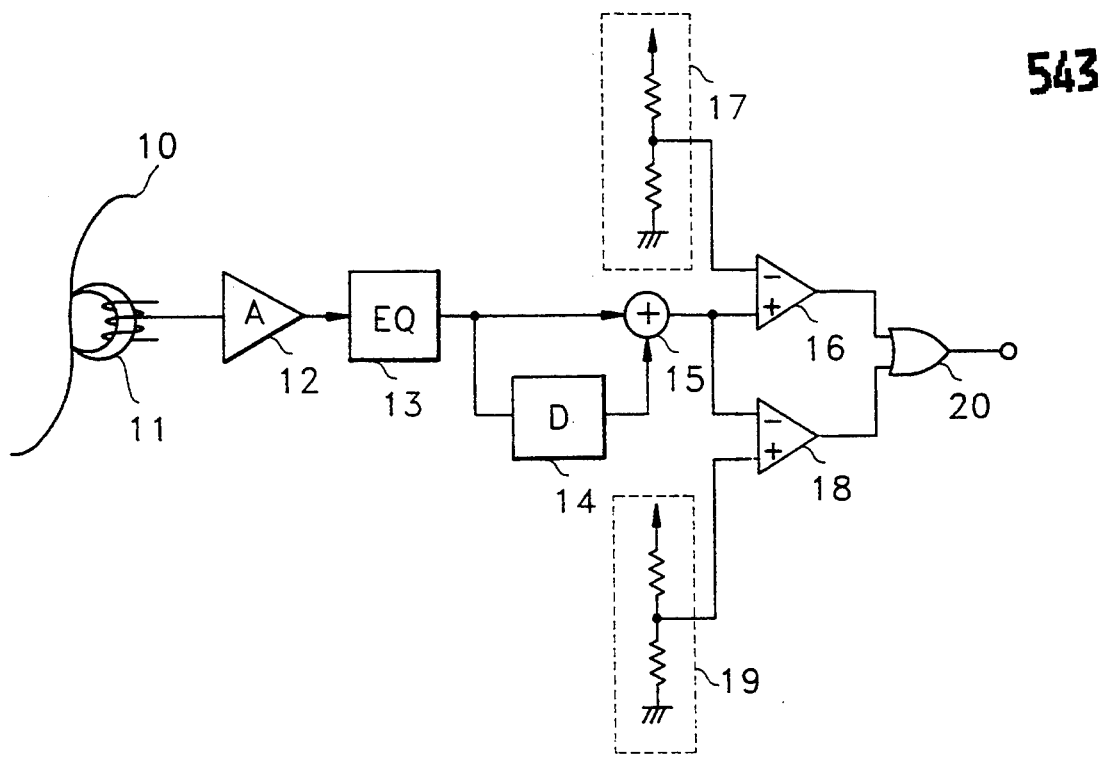
FIG. 1 is a circuit diagram showing a playback equalizing circuit of a conventional digital magnetic recording and reproducing apparatus.
Figure 2A:
FIGS. 2A to 2G show the output waveforms of the respective elements of FIG. 1.
Figure 2B:
Figure 2C:
Figure 2D:
Figure 2E:
Figure 2F:
Figure 2G:
Figure 5A:
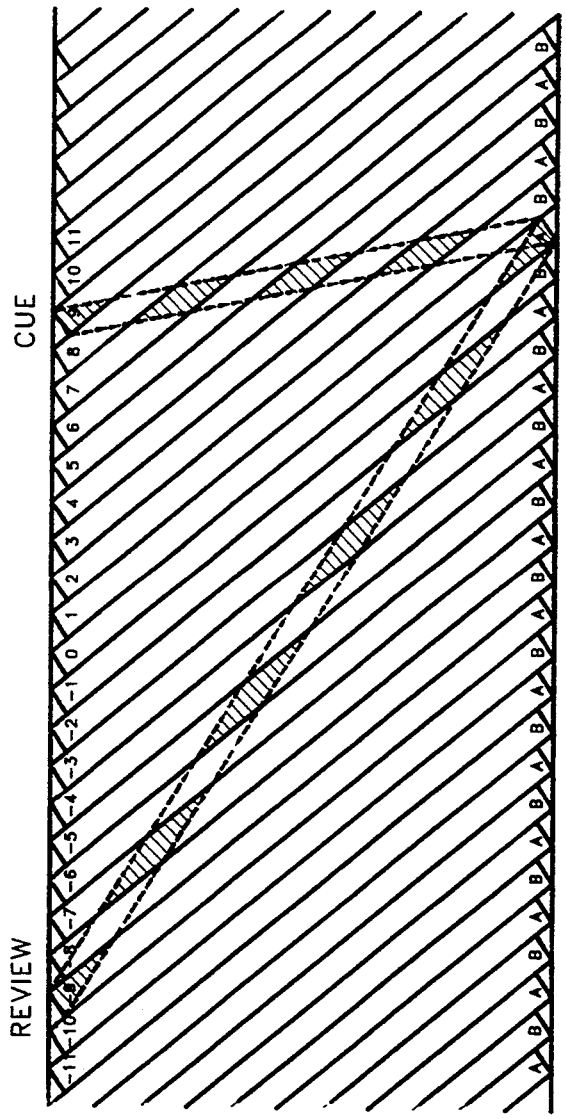
FIGS. 5A and 5B are diagrams showing the traces of a head and an RF envelop waveform during reproducing at a 9-fold speed.
Figure 5B:
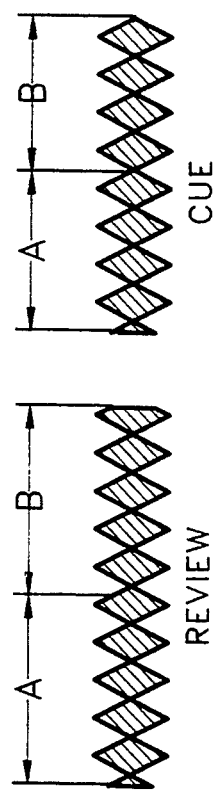
Figure 6:
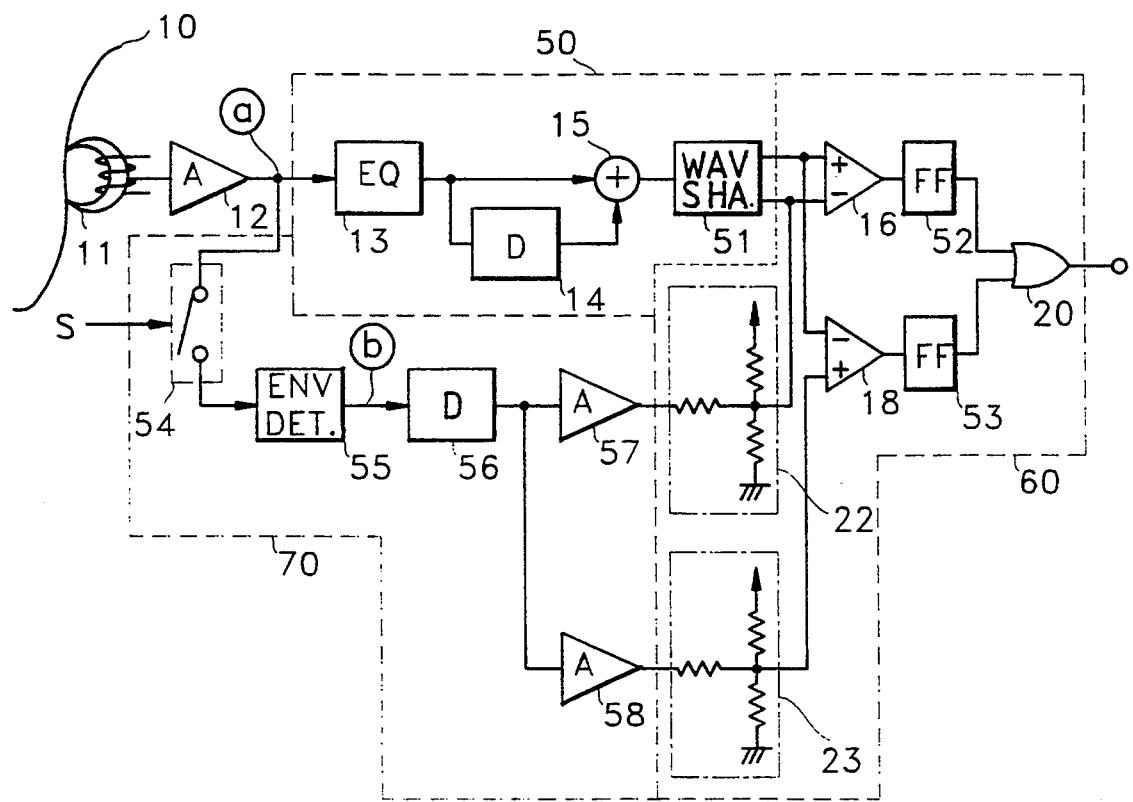
FIG. 6 is a structural diagram showing an embodiment of the playback equalizing circuit of a digital magnetic recording and reproducing apparatus according to the present invention.

FIG. 6 shows a playback equalizing circuit of a digital VCR capable of improving the playback characteristics of a signal by controlling a reference voltage which is level, one of the features of the present invention. The playback equalizing circuit comprises a signal processing unit 50, a signal outputting unit 60, and a reference signal controlling unit 70. In signal processing unit 50 which receives a signal picked up from a magnetic tape 10 via a playback head 11 and amplified by an amplifier 12, an equalizer 13 reinforces the high-frequency component of the signal, a delay line 14 delays the signal, an adder 15 sums the original signal and the delayed signal, and a waveform-shaper 51 shapes the combined signal and outputs it to signal outputting unit 60.

Signal outputting unit 60 includes a first comparator 16, a first reference voltage supplier 22, a second comparator 18, a second reference voltage supplier 23, a first and second flip-flop 52 and 53, and an OR gate 20, and ultimately restores the processed video signal into the original signal. Here, if an input signal voltage is higher than the reference voltage of a first reference voltage supplier 22, first comparator 16 outputs a first pulse signal via a first flip-flop 52. Conversely, if an input signal voltage is lower than the reference voltage of a second reference voltage supplier 23, second comparator 18 outputs the second pulse signal via a second flip-flop 53. The first and second pulse signals are processed by OR gate 20 to be output.

Figure 7A:
FIGS. 7A and 7B respectively show a playback high-frequency signal waveform and an operational waveform of a playback high-frequency signal during high-speed search of FIG. 6.
Figure 7B:

A reference signal controlling unit 70 includes a switch 54, an envelope detector 55, a delayer 56, and amplifiers 57 and 58. Reference signal controlling unit 70 receives an amplified signal (the waveform of FIG. 7A) via a switch 54 which is "on" during variable-speed reproducing. Envelope detector 55 detects the envelope of the input signal (the waveform of FIG. 7B), and then the detected signal is timing-matched with a playback signal via delay line 56. The signal is fed to first reference voltage supplier 22 via amplifier 57, and fed to second reference voltage supplier 23 via amplifier 58.

Accordingly, the reference voltage level is automatically controlled to correspond to the operational line of the playback signal, so that the playback apparatus can prevent unstable playback equalizing characteristics by the level variation of a playback signal during variable-speed reproducing such as a high-speed search. Therefore, even though the level variation of a playback signal is severe during high-speed reproduction in a digital VCR, the playback characteristics can be improved during a high-speed search by controlling a stable reference voltage in response to the level variation.

Another embodiment of the present invention which can also reproduce a signal stably by controlling the envelop level, will be described with reference to FIG. 8.

Figure 8:
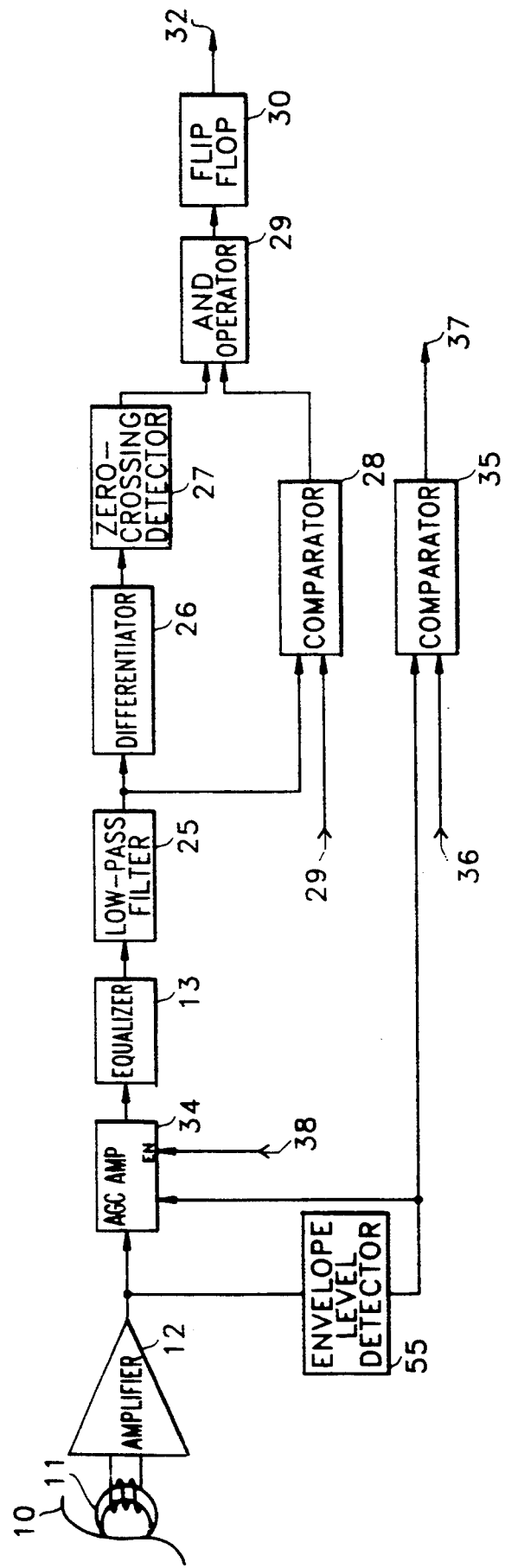
FIG. 8 is a structural diagram showing another embodiment of a playback equalizing circuit of a digital magnetic recording and reproducing apparatus by the differential method according to the present invention.

In the structure of FIG. 8, a digital playback apparatus comprises a playback head 11 for converting the magnetic information recorded on a tape 10 into an electric signal, an amplifier 12 for amplifying the signal picked up from the playback head, an equalizer 13 for reinforcing the high-frequency component of the amplified signal, a low-pass filter 25 for removing the low-frequency component from the output of the equalizer, a differentiator 26 for differentiating the signal, a zero-crossing detector 27 for detecting the zero points of the differentiated signal, a voltage comparator 28 for outputting the peak value according to the value resulting after comparing the reference voltage applied to terminal 29 with the output signal of the low-pass filter 25, an AND operator 29 for AND-operating the output signals of zero-crossing detector 27 and voltage comparator 28, and a flip-flop 30 for reproducing the original digital signal by means of the output of the AND operator 29. Also, the apparatus comprises an envelope detector 55 for detecting the RF envelope level of the picked-up signal, an automatic gain controller AGC 34 installed between amplifier 12 and equalizer 13 for maintaining a constant amplitude in the picked-up signal using the output of envelope level detector 55, and further comprises a comparator 35 for comparing the reference signal and the output of envelope level detector 55. Here, an input terminal 36 of a second reference signal supplied to comparator 35 provides a reference signal for judging a drop-out error. An enable terminal 38 connected to automatic gain controller 34 receives a predetermined signal indicating variable-speed playback.

Detailed description of the elements shown in FIG. 8, whose operations are the same as those of the aforementioned prior art are omitted. Envelope level detector 55 detects an RF envelope level of a picked-up signal amplified in amplifier 12. The output of enveloped level detector 55 corrects the envelope level of a picked-up signal after being supplied to the control terminal of automatic gain controller 34. The picked-up signal having an envelope level corrected in automatic gain controller 34 is supplied to equalizer 13. The operation of the remaining blocks is the same as FIG. 3.

Meanwhile, the enable input terminal of automatic gain controller 34 receives the signal showing a variable-speed playback via an enable terminal 38. Accordingly, it is possible to control AGC operation by supplying the variable-speed playback signal to the enable terminal. It will be appreciated that the enable signal applied to enable terminal 38 permits the automatic gain controller 34 to operate in first and second operation modes by employing the enable signal to control application of the output of the envelope detector 55 to the automatic gain controller 34. The level of the signal input via amplifier 12 is detected in envelope level detector 55, so that the corresponding output is supplied to the first input terminal of comparator 35. The second reference signal is supplied to the second input terminal of comparator 35 via the second reference signal input terminal 36 to judge the drop-out error. Comparator 35 compares the signals supplied to the first and second input terminals, and then outputs the peak value. Accordingly, the decision signal output from comparator 35 can be used as a signal for drop-out compensation in a data processing unit (not shown), and it is possibly performed in the present invention even without comparator 35.

Figure 9A:
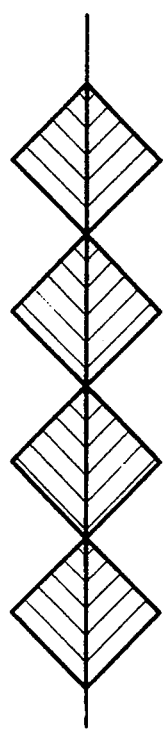
FIGS. 9A to 9C show output waveforms of various elements of the circuit shown in FIG. 8.
Figure 9B:
Figure 9C:
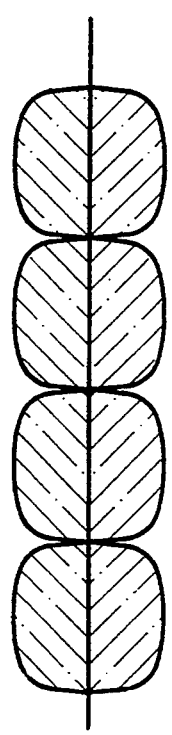

FIGS. 9A, 9B and 9C show output waveforms of the important portions in FIG. 8.

FIG. 9A shows an RF envelope waveform of a picked-up signal output from playback head 11, FIG. 9B shows an envelope level output from level detector 55, and FIG. 9C shows the waveform of a picked-up signal having a corrected envelope level output from AGC 34. As shown in FIGS. 9A to 9C, it is noted that the RF envelope level of a picked-up signal in head 11 is improved by the present invention.

By controlling the envelope level as above, during reproducing at a variable speed, the RF envelope waveform of the picked-up signal output from the head is improved in such a manner that the amplitude of its peripheral portion is corrected to be almost equal to that of the central portion per a track scanning period, so that the valid term where the recorded data can be reproduced is lengthened, thereby improving the quality of the reproduced signal. Also, by detecting the dropped-out portion, a drop-out decision signal wherein a correcting process can be performed in a data processing unit is provided to improve the reliability during signal reproduction.

What is claimed is:

1. A playback equalizing circuit in a digital magnetic recording and reproducing apparatus including pick-up means for converting digital information recorded onto a recording medium into an electrical signal, converting means for converting the level of a signal picked-up in said pick-up means, and data restoring means for reproducing original information form said level-controlled signal, said circuit comprising:

envelop detecting means for detecting the envelope level of said picked-up signal and reproducing an envelope signal; and automatic gain control means for receiving said picked-up signal and for controlling gain in response to the envelope signal generated by said envelope detecting means to thereby provide a gain controlled signal;

wherein said automatic gain control means further comprise an enable terminal for receiving a signal indicating a variable-speed playback mode.

2. A playback equalizing circuit as claimed in claim 1, further comprising comparing means for comparing the output of said envelope detecting means and a reference signal for determining drop-out.

3. A playback equalizing circuit in a digital magnetic recording and reproducing apparatus including a pick-up for recovering digital information recorded on a recording medium into an electrical signal, a convertor for converting the level of a signal picked-up in said pick-up and data restoring means for reproducing digital information from said level-converted signal, said circuit comprising:

an envelope detector detecting the envelope level of said digital information for providing an envelope signal; and an automatic gain control circuit receiving said digital information and controlling gain in response to said envelope signal to thereby generate a gain controlled signal;

wherein said automatic gain control circuit has a first mode of operation and a second mode of operation and wherein said automatic gain circuit receives a logic level signal to control switching between said first mode of operation and said second mode of operation.

4. The playback equalizing circuit as claimed in claim 3, wherein said automatic gain control circuit further comprises an enable terminal for receiving said logic level signal.

5. The playback equalizing circuit as claimed in claim 3, wherein said first mode of operation is a variable-speed playback mode of operation.

6. The playback equalizing circuit as claimed in claim 3, further comprising a comparator comparing the output of said envelope detector and a reference signal so as to permit determination of drop-out.

* * * * *